United States Patent
Zaugg et al.

(10) Patent No.: US 7,950,847 B2
(45) Date of Patent: May 31, 2011

(54) BREGUET OVERCOIL BALANCE SPRING MADE OF MICRO-MACHINABLE MATERIAL

(75) Inventors: Alain Zaugg, Le Brassus (CH); Christophe Bifrare, Le Pont (CH)

(73) Assignee: Montres Breguet S.A., L'Abbaye (CH)

( * ) Notice: Subject to any disclaimer, the term of this patent is extended or adjusted under 35 U.S.C. 154(b) by 0 days.

(21) Appl. No.: 12/605,487

(22) Filed: Oct. 26, 2009

(65) Prior Publication Data

US 2010/0110840 A1    May 6, 2010

(30) Foreign Application Priority Data

Nov. 6, 2008 (EP) .................................... 08168453

(51) Int. Cl.
G04B 17/04   (2006.01)
C23F 1/00    (2006.01)

(52) U.S. Cl. ........................................... 368/175; 216/2
(58) Field of Classification Search .......... 368/175–178; 216/2
See application file for complete search history.

(56) References Cited

U.S. PATENT DOCUMENTS

| | | | | |
|---|---|---|---|---|
| 30,247 A * | 10/1860 | Reed | ............................ | 368/175 |
| 109,826 A * | 12/1870 | Kline | ............................ | 368/175 |
| 469,914 A * | 3/1892 | Olsen | ............................ | 368/175 |
| 539,578 A * | 5/1895 | Johanson | ............................ | 280/63 |
| 548,169 A * | 10/1895 | Anzelewitz | ............................ | 368/175 |
| 570,394 A * | 10/1896 | Griscom | ............................ | 368/175 |
| 811,346 A * | 1/1906 | Weser | ............................ | 368/175 |
| 1,311,501 A * | 7/1919 | Ecaubert | ............................ | 368/178 |
| 2,105,966 A * | 1/1938 | Bowen | ............................ | 368/175 |
| 2,584,786 A * | 2/1952 | Burghoff | ............................ | 29/896.3 |
| 2,698,509 A * | 1/1955 | Van Valkenburgh et al. | . | 368/175 |
| 2,717,487 A * | 9/1955 | Koehler | ............................ | 368/175 |
| 2,997,841 A * | 8/1961 | Loge | ............................ | 368/175 |
| 3,016,688 A * | 1/1962 | Rueger | ............................ | 368/178 |
| 3,958,410 A * | 5/1976 | Bell | ............................ | 368/175 |
| 7,503,688 B2 * | 3/2009 | Hessler et al. | ............ | 368/169 |
| 7,682,068 B2 * | 3/2010 | Bourgeois | .................. | 368/169 |
| 2006/0002240 A1 * | 1/2006 | Peters et al. | .............. | 368/169 |
| 2009/0116343 A1 * | 5/2009 | Levingston | ................. | 368/140 |
| 2009/0245030 A1 * | 10/2009 | Buhler et al. | .............. | 368/177 |
| 2010/0061192 A1 * | 3/2010 | Hessler et al. | ............. | 368/177 |
| 2010/0149927 A1 * | 6/2010 | Zaugg et al. | .............. | 368/177 |

FOREIGN PATENT DOCUMENTS

CH    695 395    4/2006

(Continued)

OTHER PUBLICATIONS

Search Report issued in corresponding application No. EP 08168453, completed May 8, 2009.

Primary Examiner — Sean Kayes
(74) Attorney, Agent, or Firm — Griffin & Szipl, P.C.

(57) ABSTRACT

The invention relates to a Breguet overcoil balance spring (1) that includes a hairspring (3) mounted in a single part, made of micro-machinable material, and coaxially with a collet (5). According to the invention, the balance spring has a terminal curve (7) made of micro-machinable material and an elevation device (9) made of micro-machinable material between the outer coil (15) of the hairspring and the terminal curve to improve the concentric development of the balance spring. The invention also relates to the method of manufacturing the balance spring. The invention concerns the field of timepiece making.

10 Claims, 4 Drawing Sheets

| FOREIGN PATENT DOCUMENTS | | |
|---|---|---|
| EP | 2 315 714 | 1/1977 |
| EP | 0 732 635 | 9/1996 |
| EP | 1 605 323 | 12/2005 |
| EP | 1 818 736 | 8/2007 |
| EP | 1 837 722 | 9/2007 |
| EP | 1 978 421 | 10/2008 |

* cited by examiner

BREGUET OVERCOIL BALANCE SPRING MADE OF MICRO-MACHINABLE MATERIAL

This application claims priority from European Patent Application No. 08168453.2, filed Nov. 6, 2008, the entire disclosure of which is incorporated herein by reference.

FIELD OF THE INVENTION

The invention relates to a Breguet overcoil balance spring and the method of manufacturing the same and, more specifically, a balance-spring of this type based on a micro-machinable material.

BACKGROUND OF THE INVENTION

The regulating member of a timepiece generally includes an inertia flywheel called a balance and a resonator called a balance spring. These parts determine the working quality of the timepiece. Indeed, they regulate the working of the movement, i.e. they control the frequency thereof.

It is known to fabricate a timepiece part in a silicon-based material. The use of a micro-machinable material, like silicon, has advantages in terms of manufacturing precision, owing to progress in current methods, particularly within the field of electronics. Advantage can also be taken of the very low sensitivity of silicon to magnetism and temperature changes. However, the parts to be made must be flat, as it is not currently possible to make silicon parts with several levels.

SUMMARY OF THE INVENTION

It is an object of the present invention to overcome all or part of the aforementioned drawbacks by proposing a Breguet overcoil balance-spring made of micro-machinable material that is simple to manufacture and that allows reduced rate variation.

The invention therefore concerns a Breguet overcoil balance-spring made of micro-machinable material that includes a hairspring mounted in a single part, coaxially with a collet, characterized in that it includes a terminal curve and an elevation device between the outer coil of said hairspring and said terminal curve so as to improve the concentric development of said balance spring.

Advantageously, from flat parts made of a micro-machinable material, a simple assembly with several planes is produced, which is virtually insensitive to magnetism and to temperature change and which no longer requires the complex adjustment steps currently carried out to manufacture this type of balance spring from a metal strip.

According to other advantageous features of the invention:

the elevation device includes a mechanical fastener or attachment member connecting one end of said outer coil to one end of said terminal curve;
according to a first embodiment, the mechanical fastener has a main body extended on each side by gripping means;
each gripping means has an approximately U-shaped profile for receiving one of said ends by overlapping;
according to a second embodiment, the mechanical fastener has a main body on which the gripping means are elastically mounted for respectively locking the ends of said outer coil and said terminal curve against the main body;
the gripping means have first and second arms respectively attached to first and second ends of the main body;
each of said ends is locked, along the thickness thereof, by the thrust of a contact of one of said arms against a stop member of said main body;
each of said ends is locked along the height thereof, by the thrust of a second contact of one of said arms against a second stop member of said main body;
the arms are approximately parallel to the main body;
according to both embodiments, the mechanical fastener has central symmetry relative to the centre of the main body;
the elevation device has bumps, over at least one of said ends, for delimiting the position of the fastener relative to the length of said at least one of said ends;
the elevation device further includes joining means between said mechanical fastener and said ends so as to improve the securing force of said elevation device;
the joining means comprise a layer that includes an adhesive material, a metallic material, an oxide or a fused alloy of the materials used, or even a braze or solder;
said micro-machinable material is silicon, crystallised silica or crystallised alumina based;
the terminal curve is a Phillips curve to improve the concentric development of said balance spring;
at least one inner coil of the hairspring includes a Grossmann curve to improve the concentric development of said balance spring.

Moreover, the invention relates to a timepiece, characterized in that it includes a Breguet overcoil balance spring according to any of the preceding variants.

Finally, the invention relates to a method of manufacturing a Breguet overcoil balance spring including the following step:

a) selectively etching at least one cavity in a layer of micro-machinable material to define a hairspring mounted coaxially with a collet;

characterized in that it further includes the following steps:

b) selectively etching at least one cavity in a layer of micro-machinable material to define a mechanical fastener;

c) selectively etching at least one cavity in a layer of micro-machinable material to define a terminal curve;

d) assembling the mechanical fastener between said hairspring and said terminal coil to form the Breguet overcoil balance spring.

Advantageously, few steps produce a balance spring made of micro-machinable material with improved precision compared to the complex adjustment steps currently carried out for manufacturing this type of balance spring from a metallic strip.

According to other advantageous features of the invention:

after or prior to step d), the method includes the oxidising step to improve the securing force of said mechanical fastener, or to make said Breguet overcoil balance spring more mechanically resistant and to adjust the thermoelastic coefficient thereof;
before or after step d), the method includes the step of depositing an adhesive material between said mechanical fastener and said hairspring and terminal curve;
before or after step d), the method includes the step of depositing a material between said hairspring and terminal curve and the surfaces of said mechanical fastener that will receive them, in order to drive in or solder said hairspring and terminal curve against said fastener to improve the securing force of said mechanical fastener;
steps a), b) and c) are performed at the same time in the same layer of micro-machinable material;

the method includes the final step of heating said overcoil balance spring to improve the securing force of said mechanical fastener or in order to activate said adhesive material.

BRIEF DESCRIPTION OF THE DRAWINGS

Other features and advantages will appear more clearly from the following description, given by way of non-limiting illustration, with reference to the annexed drawings, in which.

DETAILED DESCRIPTION OF PREFERRED EMBODIMENTS

Figure 1:
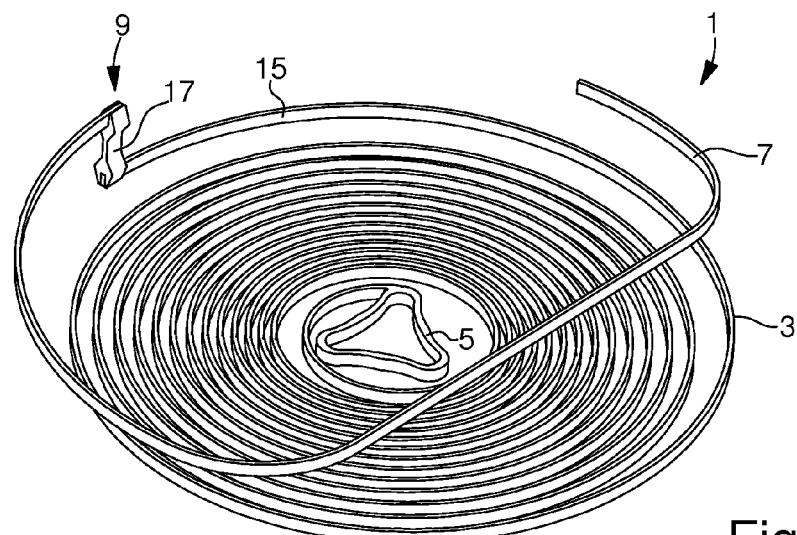
FIG. 1 is a perspective diagram of a Breguet overcoil balance spring according to the invention.
Figure 2:
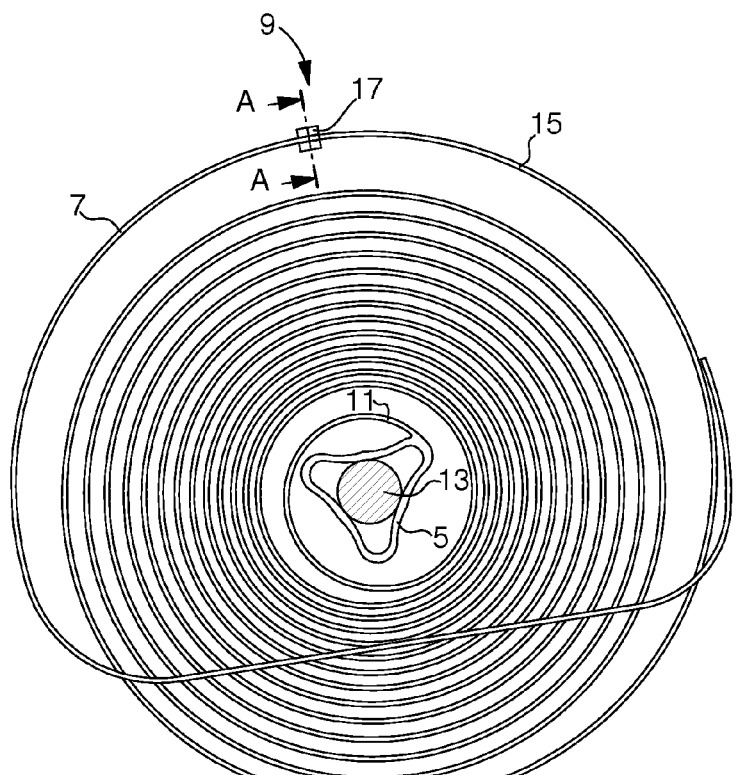
FIG. 2 is a top view diagram of FIG. 1.
Figure 3:
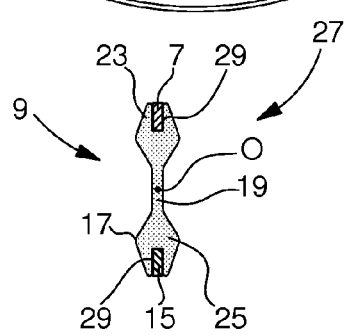
FIG. 3 is a view of the cross-section A-A of FIG. 2.

The example illustrated in FIGS. 1 to 3, shows a Breguet overcoil balance spring generally designated 1. Balance spring 1 is for mounting in a timepiece in cooperation with a balance. It includes a hairspring 3, a collet 5, a terminal curve 7 and an elevation device 9. Hairspring 3 and collet 5 preferably form a single piece to prevent imprecision at the interface between them which could be detrimental to the development symmetry of balance spring 1.

As illustrated in FIGS. 1 and 2, one can see that hairspring 3 preferably has an inner coil 11 comprising a Grossmann curve. A Grossmann curve compensates for the use of a collet 5 by rectifying inner coil 11 relative to the ideal curve of a perfect Archimedes balance spring. FIGS. 1 and 2 also show that collet 5 is generally triangular and able to receive a balance staff 13. Of course, the general shape of balance staff 13 may differ without departing from the scope of the invention.

Preferably, in the example illustrated in FIGS. 1 and 2, terminal curve 7 is a Phillips curve, i.e. a curve which, during the development of balance spring 1, maintains its centre of gravity on balance staff 13. Preferably, as illustrated in FIG. 2, the height of terminal curve 7 and hairspring 3 is identical.

Because of the geometrical conformity of terminal curve 7 and the assembly of hairspring 3—collet 5 explained above, the symmetrical development of balance spring 1 is structurally guaranteed, however the manufacturing type and material used must not hinder development.

To guarantee the manufacturing precision of these curves, but also to make balance spring 1 virtually insensitive to magnetism and temperature change, a silicon-based material can be used. Indeed, this is a micro-machinable material, i.e. a material that can be manufactured with accuracy of less than a micrometer, for example, by deep reactive ion etching (DRIE) a crystalline silicon-based wafer.

Of course, silicon is not the only material that has these properties. Other micro-machinable materials can be envisaged, such as, for example, crystallised silica or crystallised alumina.

Preferably, the silicon-based material may also be coated with its oxide so as to adapt its thermal expansion, but also its thermo-elastic coefficient relative to the balance for finely adjusting the isochronism of the timepiece movement, i.e. for reducing its rate variation to a minimum.

To make Breguet overcoil balance spring 1, an elevation device 9 is used for securing the outer coil 15 of hairspring 3 to terminal curve 7 located above said hairspring. As illustrated in FIGS. 1 to 3, elevation device 9 includes a mechanical fastener or attachment member 17 that has a main body 19 extended on each side by gripping means 23, 25. Like terminal curve 7 and the hairspring 3—collet 5 assembly, mechanical fastener 17 is also preferably made from a micro-machinable material such as, for example, a silicon-based material.

As illustrated in cross-section in FIG. 3, main body 19 of mechanical fastener 17 is approximately parallelepiped and has a thickness that is approximately equivalent to the height of terminal curve 7 and outer coil 15 of hairspring 3. Gripping means 23, 25 are approximately symmetrical relative to main body 19 and each includes an approximately U-shaped profile for attachment respectively to the end of terminal curve 7 and the end of outer coil 15 of hairspring 3 by at least partial overlapping.

In the example illustrated in FIGS. 1 to 3, the U-shaped profiles are made over the entire width of mechanical fastener 17 and respectively cover the entire thickness of terminal curve 7 and outer coil 15 of hairspring 3, leaving only one of the faces parallel to the height uncovered. Of course, the profiles of gripping means 23, 25 may be different from each other and/or not be uniform over the entire width of mechanical fastener 17 and/or extend only over part of said width. It is also possible to envisage that at least one of the profiles is not U-shaped but approximately circular, elliptical, square or rectangular, thus enabling the end of terminal curve 7 and/or outer coil 15 of hairspring 3 to be entirely covered.

According to a second embodiment of elevation device 59, a Breguet overcoil balance spring 51 is made as illustrated in FIGS. 5 to 8. The balance spring 51 is also a Breguet overcoil and has the same features as the first embodiment with the exception of elevation device 59. This device is for joining outer coil 65 of hairspring 53 to terminal curve 57, located above said hairspring.

As illustrated in FIGS. 5 to 8, elevation device 59 has a mechanical fastener or attachment member 67 including a main body 69 on which gripping means 73, 75 are elastically mounted to lock ends 61, 63 respectively of outer coil 65 and terminal curve 57 against main body 69.

As for terminal curve 57 and the hairspring 53—collet 55 assembly, mechanical fastener 67 is also preferably made from a micro-machinable material such as, for example, a silicon-based material.

Figure 7:
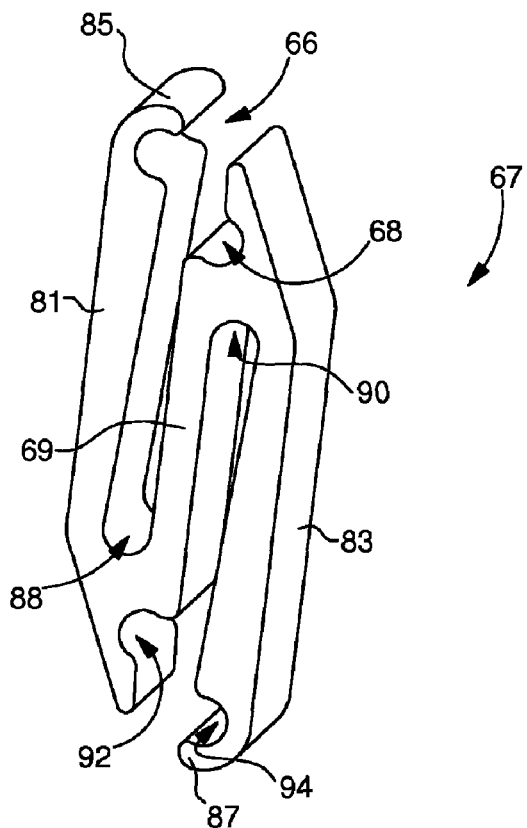
FIG. 7 is a perspective diagram of a mechanical fastener according to the invention.
Figure 8:
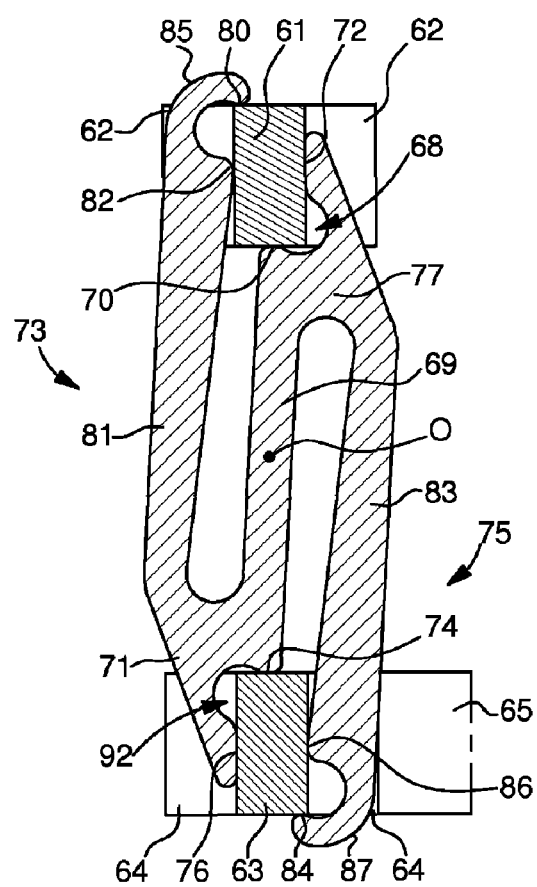
FIG. 8 is a cross-section of one part of FIG. 5.

As illustrated in FIGS. 7 and 8, mechanical fastener 67 has an approximately parallelepiped main body 69 and, like mechanical fastener 17 of the first embodiment, preferably has central symmetry relative to the centre O of main body 69. Moreover, gripping means 73, 75 have first 81 and second 83 arms respectively attached to first 71 and second 77 ends of main body 69 and they are for attachment respectively to end 61 of terminal curve 57 and to end 63 of outer coil 65 of hairspring 53 by at least partial overlapping.

As visible in FIGS. 7 and 8, arms 81, 83 are approximately parallel to main body 69. Moreover, advantageously according to the invention, arms 81 and 83 are made elastically mobile by the formation of hollows 88, 90 that allow them to travel relative to main body 69.

More specifically, each of ends 61, 63 is locked along the thickness thereof by the thrust of a contact 82, 86 of one of said arms 81, 83 against a stop member 72, 76 of main body 69. Thus, as is visible in FIG. 8, contact 82 of first arm 81 pushes end 61 of terminal curve 57 against stop member 72 of end 77 of main body 69. Moreover, contact 86 of second arm 83 pushes end 63 of outer coil 65 of hairspring 53 against stop member 76 of end 71 of main body 69. Thus, as for the first embodiment, fastener 67 grips each of ends 61, 63 along the thickness thereof.

Preferably, according to the invention, each contact 72, 76 is elastically mounted on its end 77, 71 by the formation of hollows 68, 92 that allow them to travel relative to the rest of main body 69.

Advantageously, compared to the first embodiment, elevation device 59 also allows each of ends 61, 63 to be locked along the height thereof by the thrust of a second contact 80, 84 of one of said arms 81, 83 against a second stop member 70, 74 of main body 69.

Thus, as is visible in FIG. 8, each arm 81, 83 has a lug 85, 87 forming a hook that supports one of said second contacts 80, 84 located approximately perpendicular to the first contact 82, 86. Advantageously according to the invention, lugs 85 and 87 are made elastically mobile by the formation of hollows 66, 94 that enable them to travel relative to their arms 81, 83.

Consequently, contact 80 of first arm 81 pushes the end 61 of terminal curve 57 against stop member 70 of end 77 of main body 69. Moreover, contact 84 of second arm 83 pushes the end 63 of outer coil 65 of hairspring 53 against stop member 74 of end 71 of main body 69. Thus, fastener 67 also grips each of ends 61, 63 along the height thereof.

Of course, the profiles of gripping means 73, 75 may be different from each other and/or not be uniform over the entire width of mechanical fastener 67 and/or extend only over part of said width. It is also possible to envisage at least one of the profiles being approximately circular, elliptical, square or rectangular and thus entirely covering end 61 of terminal curve 57 and/or end 63 of outer coil 65 of hairspring 53.

Preferably, according to the invention, for the second embodiments, on at least one of said ends, elevation device 9, 59 includes bumps 62, 64 for delimiting the position of fastener 17, 67 relative to the length of said at least one of said ends. Bumps 62, 64, which are only visible in FIGS. 5 to 8, but which apply perfectly to the first embodiment, form a frame of four studs for locking respectively the first arm 81 of end 77 of main body 69 in a certain position relative to the length of terminal curve 57 and, the second arm 83 and end 71 of main body 69 in a certain position relative to the length of hairspring 53.

It is thus clear, particularly in the case of the second embodiment, that mechanical fastener 67 is ideally locked against ends 61 and 63 along three approximately perpendicular planes.

Advantageously, elevation devices 9, 59 can also include joining means 27 for improving the securing force of elevation device 9, 59. According to the invention, several variants of the joining means are possible depending upon the method used, as explained below. Thus, the joining means include a layer 29 between mechanical fastener 17, 67 and the ends of terminal curve 7, 57 and outer coil 15, 65 of hairspring 3, 53. This layer 29 may thus comprise an adhesive material, a metallic material, an oxide or a fused alloy of the materials used or even a braze or solder.

Method 31 for manufacturing a Breguet overcoil balance spring 1, 51 according to the invention will now be explained with reference to FIG. 4. Method 31 mainly comprises a step 33 of manufacturing components and a step 37 of assembling components. Preferably, the method also includes a step 35 of mechanically reinforcing said components and a step 41 of reinforcing the assembly.

Figure 4:
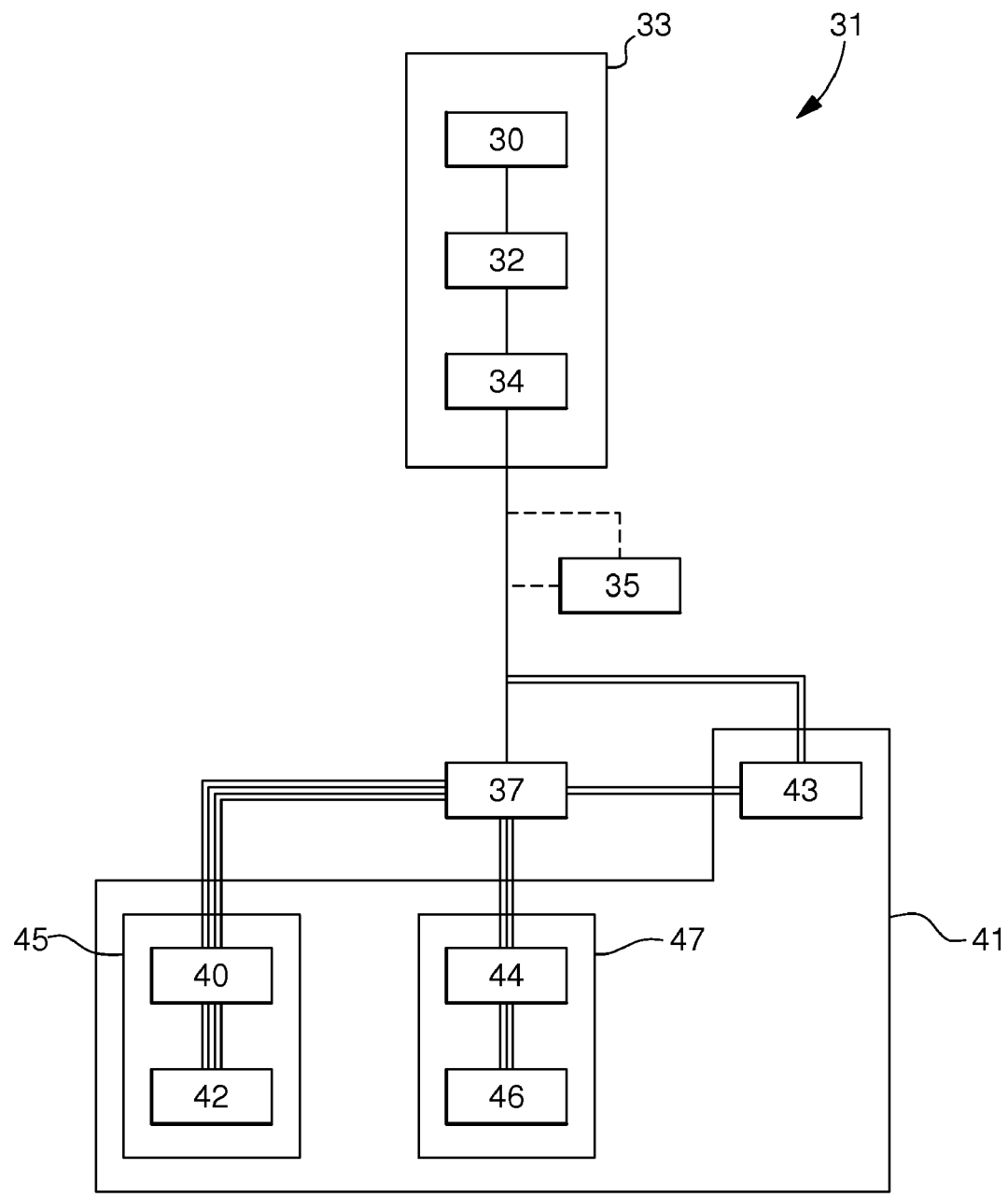
FIG. 4 is a flow chart of the steps of the manufacturing method.
Figure 5:
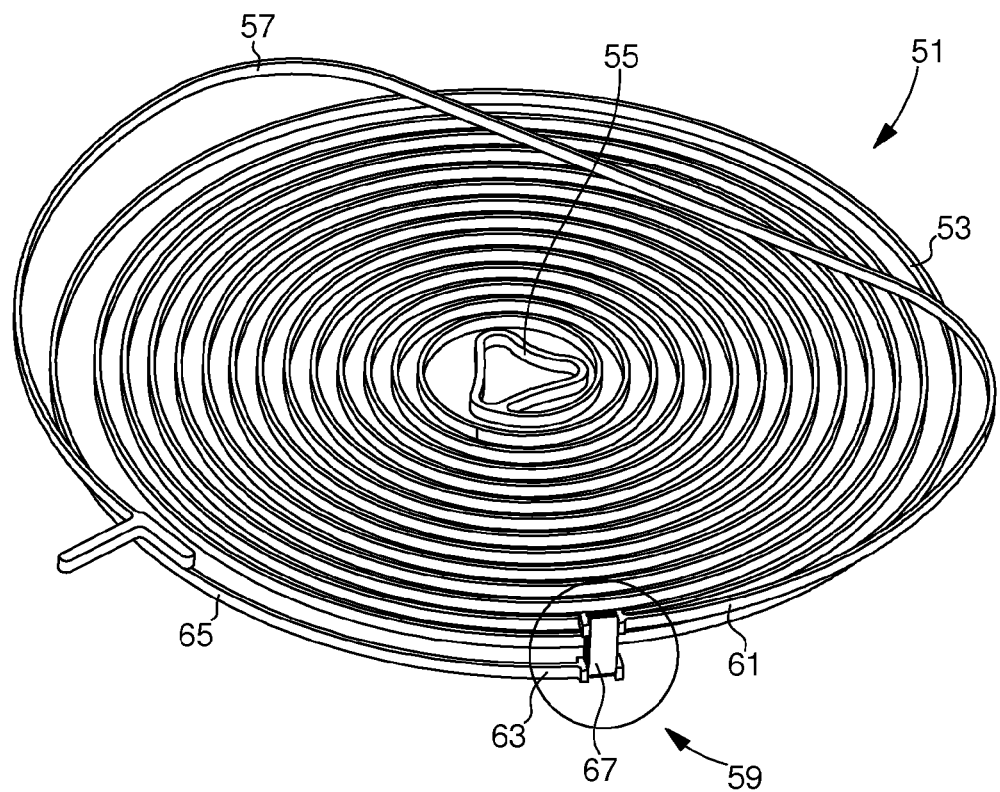
FIG. 5 is a perspective diagram of a Breguet overcoil balance spring according to a second embodiment of the invention.
Figure 6:
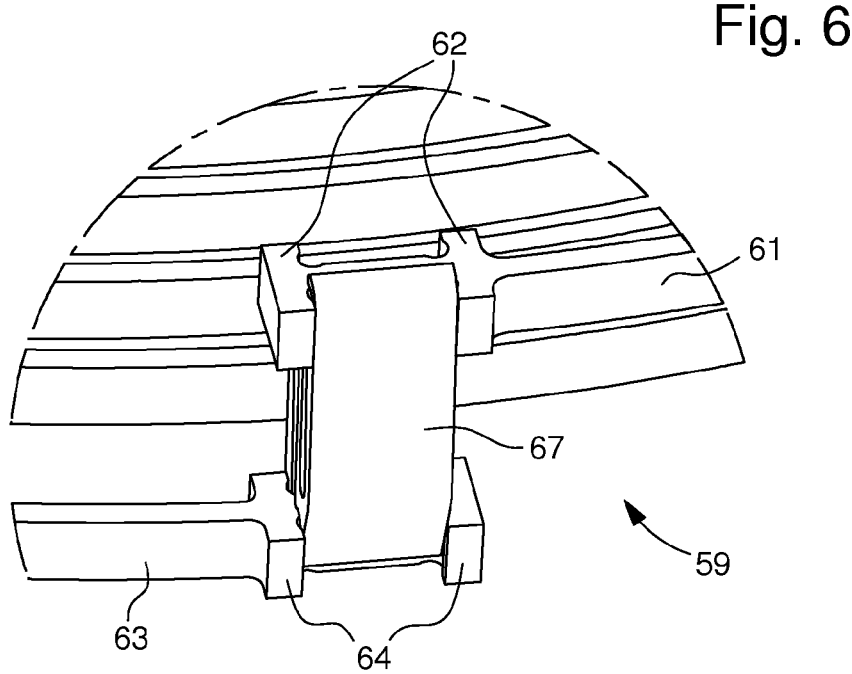
FIG. 6 is a partial enlarged view of FIG. 5.

As illustrated in FIG. 4, the first step 33 is for manufacturing, during respective phases 30, 32 and 34, the components of the Breguet overcoil balance spring 1, 51, i.e. the assembly of hairspring 3, 53—collet 5, 55, terminal curve 7, 57 and the elevation device 9, 59. Preferably, a dry or wet micro-machining technique will be used in order to manufacture said components very precisely. In the example explained above, the micro-machining may be a deep reactive ion etching type dry anisotropic etch of a crystalline silicon based wafer.

Thus, phases 30, 32 and 34 consist first of all in coating the wafer with a protective mask, for example, using a photosensitive resin photolithography method. Secondly, the wafer is subjected to the anisotropic etch, with only the unprotected parts of the wafer being etched. Finally, in a third phase, the protective mask is removed. It is thus clear that the protective mask directly determines the final shape of the etched components.

Advantageously, it is thus easy to manufacture the Breguet overcoil balance spring 1, 51 with existing movement or calibre dimensions. Thus, advantageously, movements or calibres can still be manufactured simply by replacing the metal Breguet overcoil balance spring usually used with the new one, manufactured in micro-machinable material, with an improvement in the rate variation and quality thereof.

Preferably it is also understood that it is possible perform phases 30, 32 and 34 of step 33 at the same time on the same wafer. One can therefore conclude that it is possible to etch all of the necessary components several times on said wafer.

The second step 37 is for assembling the components etched in step 33, i.e. the hairspring 3, 53—collet 5, 55 assembly, terminal curve 7, 57 and elevation device 9, 59. First of all, each necessary component is therefore detached from the etched wafer, for example by breaking bridges of material left between each component and its wafer. Secondly, the three flat components are assembled to make balance spring 1 from three parts. In this second phase, the end of outer coil 15, 65 of hairspring 3, 53 is thus fitted into one of gripping means 25, 75 of mechanical fastener 17, 67 then the end of terminal curve 7, 57 is fitted into the other gripping means 23, 73.

Preferably, according to the first embodiment, at the end of step 37, balance spring 1 has an overall height equal to twice the thickness of the etched wafer, representing terminal curve 7 and the hairspring 3—collet 5, assembly, and the length of mechanical fastener 17, which does not overlap the latter. Mechanical fastener 17 is preferably etched in the wafer in accordance with the pattern of FIG. 3.

Preferably, according to the second embodiment, at the end of step 37, balance spring 51 has an overall height equal to the height of mechanical fastener 67.

As explained above, method 31 can also include a step 35 of reinforcing the etched components. As regards the example of a silicon-based material, this step may consist in performing plasma oxidisation in order to create surface silicon dioxide. In the example illustrated in dotted lines in FIG. 4, reinforcement step 35 is performed between etching step 33 and assembly step 37, which means that the entire etched wafer can be oxidised, i.e. all the components at the same time. Of course, step 35 can also be performed after phases 30 and/or 32 and/or 34.

As explained above, method 31 may also include a step 41 for reinforcing the assembly of the etched components. In the example illustrated in FIG. 4, three distinct embodiments can be identified, the processes of which are shown using double, triple or quadruple lines.

According to a first embodiment, illustrated by a double line in FIG. 4, reinforcement step 41 can consist in depositing, during phase 43, a layer 29 inside gripping means 23, 73 and/or 25, 75, so as to allow mechanical fastener 17, 67 to be driven onto the ends of terminal curve 7, 57 and outer coil 15, 65 of hairspring 3, 53. Thus, in the aforecited example of silicon-based material, this layer 29 could consist of a metallic layer, obtained, for example, by vapour phase deposition. The absence of any plastic domain in silicon may require the use of a layer 29 that can be deformed to prevent gripping means 23, 73, 25, 75 from breaking, since the driving in force necessary for balance spring 1, 51 to work properly may generate stress greater than the limits of the elastic zone of said silicon.

Of course, alternatively, layers 29 may also be deposited not inside gripping means 23, 73, 25, 75, but on the ends of terminal curve 7, 57 and outer coil 15, 65 of hairspring 3, 53. It is clear thus, in the example illustrated by a double line in FIG. 4, that in the first embodiment, layers 29 have to be deposited prior to assembly step 37. However, the deposition of phase 43 may also consist of a braze layer 29. The braze could then be performed either during assembly step 37 or afterwards.

According to a second embodiment illustrated by a quadruple line in FIG. 4, assembly reinforcing step 41 may consist, during a process 45, in depositing an adhesive layer 29 between gripping means 23, 73 and/or 25, 75 and terminal curve 7, 57 and outer coil 15, 65 of hairspring 3, 53, to improve the securing force of elevation device 9, 59. Thus, a first phase 40 may consist in depositing an adhesive material at the interface of the assembled components then, preferably, in a second phase 42 in heating the assembly to activate said adhesive material. This layer 29 could then consist, for example, of a polymer adhesive layer.

Of course, alternatively, deposition phase 40 may also be performed prior to assembly step 37 if the adhesive material is not viscous enough in the non-activated state. The deposition could then be carried out inside gripping means 23, 73, 25, 75 and/or on the ends of terminal curve 7, 57 and outer coil 15, 65 of hairspring 3, 53 prior to assembly step 37 and, preferably heated, after assembly step 37 during phase 42. It is thus clear, in this second embodiment example, that, owing to their power of adherence, layers 29 hold the assembly firmly in place.

According to a third embodiment illustrated by a triple line in FIG. 4, assembly reinforcing step 41 may consist, during a process 47, in forming a joining layer 29 between gripping means 23, 73 and/or 25, 75 and terminal curve 7, 57 and hairspring 3, 53 to improve the securing force of elevation device 9, 59.

Thus, in the aforecited example of silicon-based material, a first phase 44 may consist in oxidising, for example by plasma etching, the surface of silicon-based balance spring 1, 51 to form a silicon dioxide layer that can improve the joint between its assembled components, then, preferably in a second phase 46, heating the assembly to perfect said joint.

Of course, alternatively, oxidising phase 44 may also be performed before assembly step 37 and replaced by optional oxidisation step 35. Thus, the already oxidised components would be assembled during step 37 and preferably heated during phase 46 to create a single silicon dioxide layer 29 at the interface between mechanical fastener 17, 67, terminal curve 7, 57 and hairspring 3, 53. It will be noted that a hydrophilising phase prior to heating phase 46 improves the step of joining the silicon dioxide layers. It is thus clear, in this third embodiment example, that layers 29, like the other two embodiments, permit a reinforcement of the assembly between mechanical fastener 17, 67, terminal curve 7, 57 and mainspring 3, 53.

Finally, by way of alternative to the third embodiment, one could envisage a process 47 comprising a single step 46 of heating the silicon components assembled in step 37 to weld the stressed interfaces of said components.

What is claimed is:

1. A method of manufacturing a Breguet overcoil balance spring that includes the following steps:
   a) selectively etching at least one cavity in a layer of micro-machinable material to define a hairspring mounted coaxially with a collet;
   b) selectively etching at least one cavity in a layer of micro-machinable material to define a mechanical fastener;
   c) selectively etching at least one cavity in a layer of micro-machinable material to define a terminal curve; and
   d) assembling the mechanical fastener between said balance spring and said terminal coil to form the elevation curve balance spring.

2. The method according to claim 1, wherein said micro-machinable material is crystalline silicon and in that the method further includes, after step d), the following step:
   e) oxidising said raised balance spring to improve the securing force of said mechanical fastener.

3. The method according to claim 2, wherein said micro-machinable material is crystalline silicon and in that the method further includes the following final step:
   f) heating said Breguet overcoil balance spring to improve the securing force of said mechanical fastener.

4. The method according to claim 1, wherein the method further includes, after or prior to step d), the following step:
   g) depositing an adhesive material between said mechanical fastener and said hairspring and terminal curve;
   and wherein the method further includes the following final step:
   h) heating said balance spring to activate said adhesive material so as to improve the securing force of said mechanical fastener.

5. The method according to claim 1, wherein said micro-machinable material is crystalline silicon and wherein the method further includes, prior to step d), the following step:
   i) depositing a metallic material between said hairspring and terminal curve and the surfaces of said mechanical fastener for receiving the same for driving said surfaces against said fastener in step d) to improve the securing force of said mechanical fastener.

6. The method according to claim 1, wherein said micro-machinable material is crystalline silicon and wherein the method further includes, during or after step d), the following step:
   i) depositing a brazing material between said hairspring and terminal curve and the surfaces of said mechanical fastener that receive the same to braze said surfaces against said fastener in order to improve the securing force of said mechanical fastener.

7. The method according to claim 1, wherein steps a), b) and c) are performed at the same time in the same layer of micro-machinable material.

8. The method according to claim 1, wherein said micro-machinable material is crystalline silicon and wherein the method further includes, after steps a), b) and c), the following step:
   j) oxidising said silicon to make said Breguet overcoil balance spring more mechanically resistant and to improve the thermo-elastic coefficient thereof.

9. The method according to claim 8, wherein said micro-machinable material is crystalline silicon and in that the method further includes the following final step:

f) heating said Breguet overcoil balance spring to improve the securing force of said mechanical fastener.

10. The method according to claim 1, wherein said micromachinable material is crystalline silicon and in that the method further includes the following final step:

f) heating said Breguet overcoil balance spring to improve the securing force of said mechanical fastener.

* * * * *